No. 656,305. Patented Aug. 21, 1900.
W. STRZODA.
PROCESS OF ELECTROLYTICALLY EXTRACTING ZINC FROM ORES.
(Application filed Jan. 20, 1899.)
(No Model.)
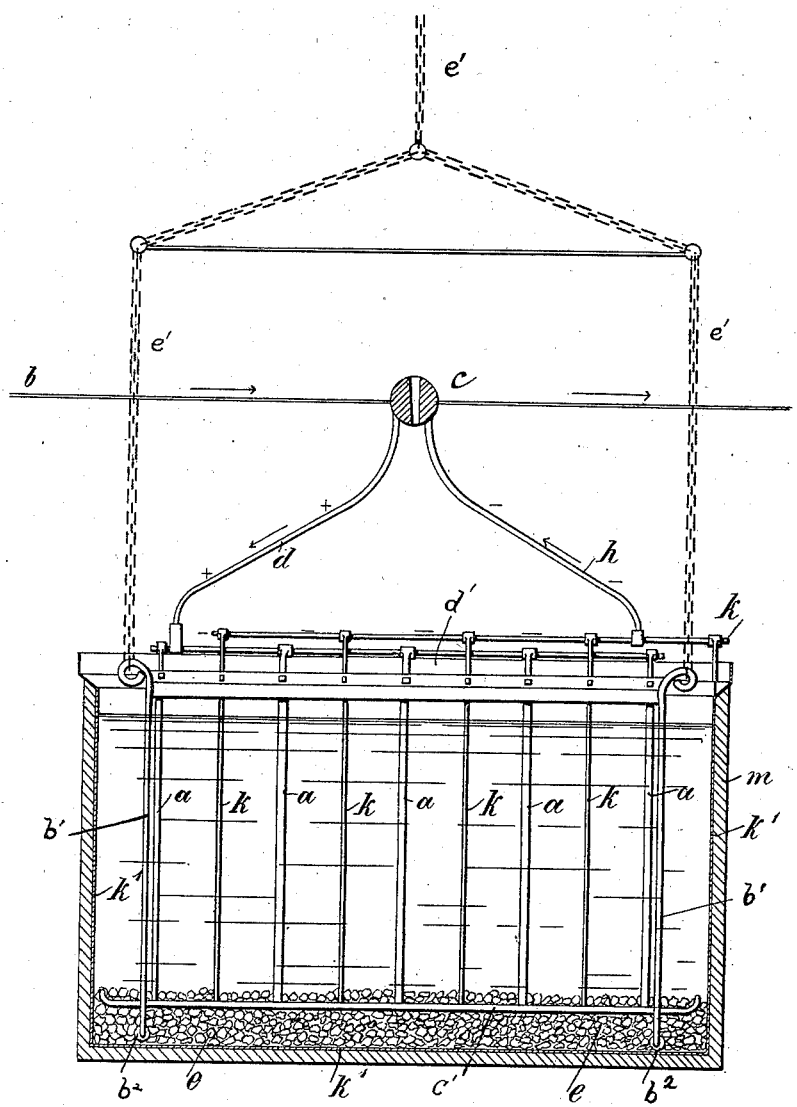
Witnesses
Frank S. Ober
James D. Donnelly
Inventor
Wilhelm Strzoda
by W. A. Rosenbaum
atty.

UNITED STATES PATENT OFFICE.

WILHELM STRZODA, OF FALENZE, GERMANY.

PROCESS OF ELECTROLYTICALLY EXTRACTING ZINC FROM ORES.

SPECIFICATION forming part of Letters Patent No. 656,305, dated August 21, 1900.

Application filed January 20, 1899. Serial No. 702,872. (No specimens.)

*To all whom it may concern:*

Be it known that I, WILHELM STRZODA, a subject of the King of Prussia, German Emperor, residing at Falenze, near Kattowitz, in the Kingdom of Prussia, Germany, have invented certain new and useful Improvements in Processes for the Electrolytic Extraction of Zinc and other Metals from Ores or Waste Containing Yhem, (for which I have applied for patents in England, No. 24,307, dated November 17, 1898; in Germany, dated October 18, 1898; in France, dated November 7, 1898, and in Belgium, dated November 5, 1898,) of which the following is a specification.

Hitherto zinc has been extracted from its ores or from waste containing zinc by first extracting the zinc by means of suitable solutions or lyes in a vat, then drawing off this lye and subjecting it to electrolysis in a separate vat.

This invention consists in electrochemically converting the zinc into a soluble compound from its ores or from zinc-waste in an alkaline bath and decomposing such compound in the same vat simultaneously, whereby metallic zinc is deposited on the cathode.

In the accompanying drawing the apparatus to be used for the present process is represented in vertical section.

$m$ is the vat in which the anodes and cathodes $k$ are arranged in a movable framework. This framework consists of end pieces $b'$, carrying rollers $b^2$ at their lower ends, which rest upon the bottom of the vat. A cross-frame $c'$, of insulating material, receives the anodes and cathodes, which are held in proper relation with each other by being secured to side bars $d'$, attached to the end pieces $b'$. The frame and the electrodes which it carries can be lifted out of the vat by means of the chains $e'$. The current comes from the conductor $b$ and passes through the switch $c$ into the conductor $d$ and from thence into the anodes $a$. After passing through the electrolyte the current returns through the cathode $k$ and the conductor $h$. The vat is preferably lined with iron or zinc sheeting $k'$, which serves as a part of the cathode and is connected to the cathodes $k$ in any suitable manner. In a few hours all the zinc, except one per cent., which remains in the ore, is deposited on the cathodes. During the whole operation the solution becomes heated to about 40° to 60°. Rapid separation is assisted by the whole liquid being maintained in constant agitation, owing to liberation of hydrogen gas on the bottom cathode, causing a thorough mixing, so that fresh ore is always able to reach the cathodes. The precipitated metal is purified according to the usual methods. For example, if the precipitate contains iron, gold, and other non-volatile metals the zinc can be distilled. Lead can be separated in the usual manner. When the process is completed, the immersed anode and cathode plates are removed from the solution and the pulpy residue reparted from the solution by means of a filter-press. The solution may be regenerated and be used again.

The foreign metals contained in the zinc ore, which consist mainly of lead and cadmium, but which may be of another character—such as tin, silver, gold, or the like—are separated metallically at the same time as the zinc.

By means of the foregoing process not only zinc ores, but also lead and cadmium ores—for instance, lead glance—may be converted into metal.

The alkaline solution may contain caustic soda, caustic potash, ammonia, or any ammoniacal salt, either alone or with the addition of a salt of potassium or sodium and the like.

The reactions in the vats are illustrated by the following example: If, for example, caiamin (carbonate of zinc) is used and as electrolyte a ten-per-cent. solution of caustic soda, the following reaction will take place:

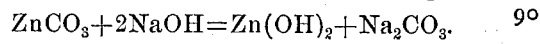
$$ZnCO_3 + 2NaOH = Zn(OH)_2 + Na_2CO_3.$$

The hydroxid of zinc becomes dissolved in the excess of caustic soda-solution:

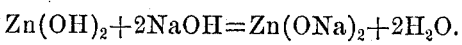
$$Zn(OH)_2 + 2NaOH = Zn(ONa)_2 + 2H_2O.$$

The alkaline-zinc solution is now decomposed by the current into metallic zinc, solution of caustic soda, and free oxygen:

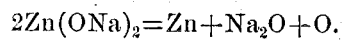
$$2Zn(ONa)_2 = Zn + Na_2O + O.$$

The sodium oxid of course becomes dissolved in excess of water as caustic soda. A similar reaction takes place if zinc-blende (sulfid of zinc) be used:

$$ZnS + 2NaOH = Zn(OH)_2 + Na_2S.$$

The dissolution of the hydroxid of zinc in the excess of caustic-soda solution and the further decomposition takes place as in the foregoing example.

As is apparent from the above statements, this invention constitutes an important technical improvement in that the extraction of the zinc from its ores and the simultaneous electric deposition of the metallic zinc take place simultaneously. The production of the zinc is thus rendered much less costly than by the methods hitherto employed, more especially because even poor zinc ores may be profitably treated by this process.

The alkali-metal-carbonate solutions occurring in the process are decomposed by means of caustic lime and the alkali is used again in the process.

What I claim, and desire to secure by Letters Patent, is—

The process of electrolytically extracting zinc from its ores which consists in placing the disintegrated or pulverized ore in its natural state in an electrolytic vat containing an aqueous alkali-metal solution capable of dissolving the ore with production of a zincate and in direct contact with the cathode, and closing the circuit through the vat, thereby precipitating zinc and the alkali metal at the cathode, the alkali metal reacting with the water to regenerate the solvent solution, substantially as described.

In witness whereof I have hereunto signed my name in the presence of two subscribing witnesses.

WILHELM STRZODA.

Witnesses:
AUGUST STRZODA,
CARL WEBER.